(12) United States Patent
Gallet

(10) Patent No.: US 9,695,703 B2
(45) Date of Patent: Jul. 4, 2017

(54) FAN HAVING A VARIABLE SETTING BY MEANS OF DIFFERENTIAL ROTATION OF THE FAN DISKS

(71) Applicant: SNECMA, Paris (FR)

(72) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 410 days.

(21) Appl. No.: 14/404,975

(22) PCT Filed: Jun. 24, 2013

(86) PCT No.: PCT/FR2013/051470
§ 371 (c)(1),
(2) Date: Dec. 2, 2014

(87) PCT Pub. No.: WO2014/001701
PCT Pub. Date: Jan. 3, 2014

(65) Prior Publication Data
US 2015/0167482 A1    Jun. 18, 2015

(30) Foreign Application Priority Data

Jun. 25, 2012   (FR) ...................................... 12 55998

(51) Int. Cl.
*F04D 29/34* (2006.01)
*F01D 9/04* (2006.01)
(Continued)

(52) U.S. Cl.
CPC .............. *F01D 9/041* (2013.01); *F01D 7/00* (2013.01); *F01D 17/12* (2013.01); *F04D 29/323* (2013.01);
(Continued)

(58) Field of Classification Search
CPC ........ F01D 5/3069; F01D 5/3076; F01D 5/30; F01D 5/3053; F04D 29/323
(Continued)

(56) References Cited

U.S. PATENT DOCUMENTS 4,810,164 A    3/1989  Wright
5,152,668 A *  10/1992 Bulman ................. B64C 11/32
                                                    416/129
(Continued)

FOREIGN PATENT DOCUMENTS

EP    0545750 A1    6/1993
EP    1961919 A2    8/2008
(Continued)

OTHER PUBLICATIONS

International Search Report issued Oct. 10, 2013 in PCT/2013/051470 filed Jun. 24, 2013.

Primary Examiner — Gregory Anderson
Assistant Examiner — Jason Fountain
(74) Attorney, Agent, or Firm — Oblon, McClelland, Maier & Neustadt, L.L.P.

(57) ABSTRACT

A compressor rotor for a turbomachine including a shaft and at least two disks mounted on the shaft to hold a single set of vanes that are rotatably mobile about the rotational axis of the shaft, at least one first disk being mounted in a mobile manner on the shaft to be able to generate an angular gap in relation to the second disk and to trigger a rotation of the vanes about the radial axis of same, at least one of the two disks being shaped to receive at least one mechanism for attaching the vanes, the connection between the disk and the attaching mechanism enabling a rotation of the attaching mechanism about a radial axis, and connection is a ball-jointed connection that is tangentially and axially mobile.

11 Claims, 2 Drawing Sheets

(51) Int. Cl.
*F01D 7/00* (2006.01)
*F04D 29/32* (2006.01)
*F01D 17/12* (2006.01)

(52) U.S. Cl.
CPC ...... *F05D 2220/36* (2013.01); *F05D 2260/74* (2013.01); *F05D 2260/79* (2013.01); *Y02T 50/671* (2013.01); *Y02T 50/673* (2013.01)

(58) Field of Classification Search
USPC .................................................. 416/204 R
See application file for complete search history.

(56) References Cited

U.S. PATENT DOCUMENTS

| | | | |
|---|---|---|---|
| 5,249,925 A | | 10/1993 | Guimbal et al. |
| 7,503,750 B1 | * | 3/2009 | Violette .................. B64C 11/06 416/134 A |
| 7,901,185 B2 | * | 3/2011 | Suciu ...................... F01D 5/148 416/155 |
| 8,075,270 B2 | * | 12/2011 | Violette ................... F01D 7/00 416/148 |
| 9,194,397 B2 | * | 11/2015 | Todorovic ............. F01D 5/3007 |
| 2008/0273976 A1 | | 11/2008 | Suciu et al. |
| 2009/0226316 A1 | | 9/2009 | Violette |
| 2009/0285656 A1 | | 11/2009 | Violette |

FOREIGN PATENT DOCUMENTS

| | | |
|---|---|---|
| GB | 2199378 | 7/1988 |
| WO | 2006086342 A2 | 8/2006 |
| WO | 2009142973 A2 | 11/2009 |

* cited by examiner

FAN HAVING A VARIABLE SETTING BY MEANS OF DIFFERENTIAL ROTATION OF THE FAN DISKS

The field of the present invention is that of turbine engines and, more specifically, that of turbojet engines having a high dilution rate, or turbofans.

A turbine engine for an aircraft generally comprises, in the downstream direction in accordance with the flow of gas, a fan, one or more compressor stages, for example, a low-pressure compressor and a high-pressure compressor, a combustion chamber, one or more turbine stages, for example, a high-pressure turbine and a low-pressure turbine, and a gas exhaust pipe. A turbine may correspond to each compressor, the two components being connected by a shaft, thereby forming, for example, a high-pressure member and a low-pressure member.

The first compression stage, or fan, in the case of a turbofan is generally characterised by a low compression rate and by a pumping range which is relatively small when it is being operated on the ground. The phenomenon of pumping corresponds to a disengagement of the air flow at the blades of the vanes and it brings about a phenomenon of instability in the flow which may result in cutting-out of the engine or even damage to the engine. This leads to risks of malfunction of the engine which could occur during the taxiing of the aircraft and which it is advantageous to avoid. To that end, a number of possibilities have been implemented. Thus, it is possible to use a pipe having a variable cross section and to open it on the ground in order to increase the pumping range or to use a fan having variable pitch, and to open that pitch on the ground.

The disadvantages encountered with a device for opening the cross section of the pipe are the additional mass and the difficulty of setting. Furthermore, the increase achieved remains limited for reasons of technological construction and it is reduced further as the dilution rate of the turbojet engine increases, which is most often the case with modern turbofans. In the case of a variable pitch device for vanes, it is common to modify the pitch of the blades and those vanes on the ground in order to improve the pumping range or during flight in order to develop the thrust of the engine and thereby to optimise the output of the propeller, in accordance with the speed of the aircraft. Therefore, multiple devices have been imagined to vary that pitch of the blades; they generally comprise rotation of the vane about the main axis thereof by means of conical pinions which are located under the base of the vane and which cooperate with conical pinions of a control system. Although the principle of this solution is already proven, it is characterised by the presence of a hub which is relatively bulky in order to be able to receive therein the conical pinions, which leads to a greater diameter for the fan and an associated disadvantage in terms of mass and drag during flight. It is further characterised by aerodynamics at the root of the blade which are difficult to optimise and by a complex mechanical architecture in order to ensure the feathering of the fan in the event of a failure of the turbojet engine.

Other devices have been proposed, such as those described in the patent applications WO 2009/142973 or EP 1961916, which set out securing members of vanes of fans which are mounted on two discs, the discs being movable relative to each other about the rotation axis of the turbojet engine. Those devices are relatively complex to produce because they use three devices in order to separately fulfil each of the three functions, the function of retaining the vane, of guiding the vane during rotation about the axis thereof and of changing the pitch thereof. Furthermore, those devices require either flexible supports for the blade roots or pivots which are mounted on bearings in order to take into account the various rotations, a requirement which is difficult to reconcile with the mechanics of the fan blades, which must take into account the great efforts necessary to maintain the vanes.

An object of the present invention is to overcome those disadvantages by providing a device which allows modification of the pitch of the vanes of a fan of a turbofan and which does not have the disadvantages of the prior art and, in particular, which is mechanically simple and has small dimensions.

To that end, the invention relates to a compressor rotor for a turbine engine comprising a shaft and at least two discs which are mounted on said shaft in order to ensure the retention of the same set of movable vanes during rotation about the rotation axis of said shaft, at least a first disc being mounted in a movable manner on said shaft in order to be able to generate angular spacing with respect to said second disc, at least one of the two discs being formed to receive at least one fixing means for the vanes, the connection between said disc and said means allowing rotation of said means about a radial axis, characterised in that said connection is a ball-and-socket joint which is tangentially and axially movable.

The ability to rotate one disc relative to the other allows, with each of them being secured to a different location on the base of the movable vanes, variation of the pitch thereof. The presence of a ball-and-socket joint allows account to be taken of both the tangential and the axial displacements of the securing locations of the vanes with respect to the two discs, by means of a connection which has been found to be advantageous in mechanical terms and which is capable of withstanding the great efforts associated with the retention of fan vanes.

Advantageously, the two discs are formed in order to receive said fixing means in the form of a ball-and-socket joint which is tangentially and axially movable.

In a specific embodiment, said disc comprises a cap, through which a hole provided with said ball-and-socket joint extends, said fixing means for the vanes being an axle which extends through the hole.

In a preferable manner, the second disc is fixed in terms of rotation in relation to said shaft, the first disc being fixed to an actuation means which comprises a fixed portion which is connected to said shaft and a movable portion, said movable portion being movable in terms of rotation about the rotation axis of said shaft.

In a more preferable manner, the actuation means is a rotary actuator. That solution has the advantage of great compactness and prevents the hub of the control device of the pitch from being too bulky.

Advantageously, the rotary actuator comprises an axle which extends in accordance with the rotation axis of said shaft, to which it is rigidly fixed, and a vessel which is movable in terms of rotation about said axle, said first disc being mounted on said vessel.

Preferably, the vessel of the rotary actuator comprises two chambers which are intended to receive a hydraulic liquid for the rotation of said first disc relative to the second disc.

In a specific embodiment, the rotor comprises a rotation guiding ring which is positioned between the two discs in order to ensure that the respective axial pitches thereof are in a permanent state.

The invention also relates to a fan module of a bypass turbojet engine having a high dilution rate, comprising a fan rotor as described above, and a bypass turbojet engine comprising such a fan module.

The invention will be better understood and other objects, details, features and advantages thereof will be appreciated more clearly from the detailed explanatory description below of an embodiment of the invention given purely by way of non-limiting example with reference to the accompanying schematic drawings, in which.

Figure 1:
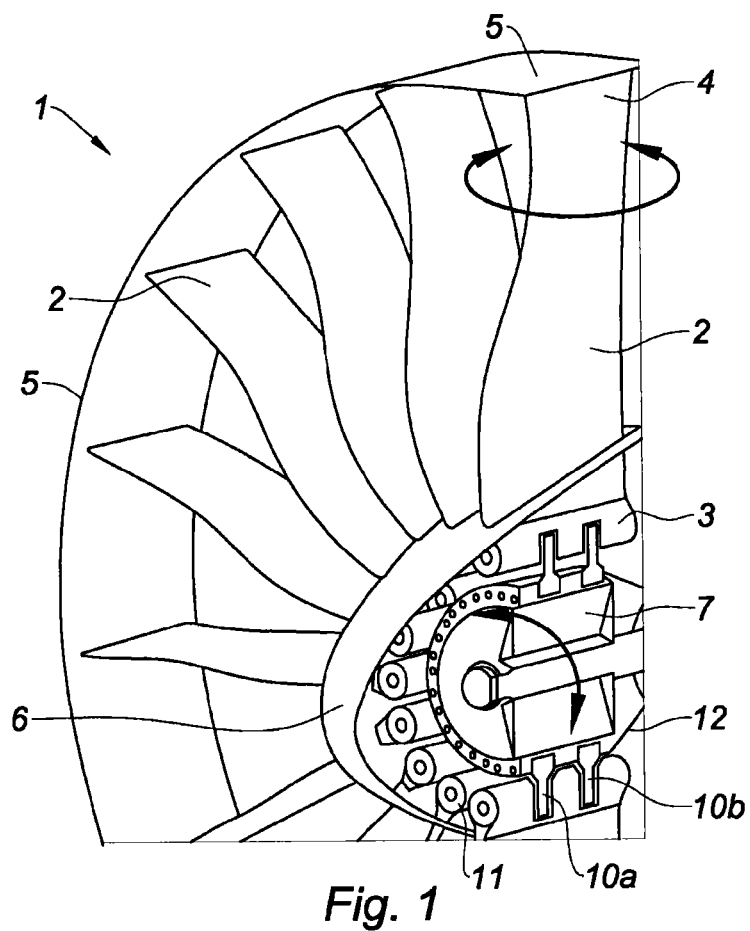
FIG. 1 is a perspective view of a turbojet engine fan with vanes whose pitch may be modified by a control device according to the invention.

With reference to FIG. 1, there may be seen a fan 1 of a turbojet engine having a high dilution rate. It is constituted by a plurality of vanes 2 which are distributed regularly over the circumference of the carrier shaft thereof and which extend between a blade root 3 which is fixed to a central hub and a blade tip 4 which moves along an outer collar 5 forming an outer channel for the air stream being entrained by the fan. The blade roots are themselves enclosed in a cone 6 which forms the internal channel of said air stream. The vanes 2, which are shown in this drawing in the feathered position, that is to say, with the chord thereof aligned in the eye of the wind, can be moved in rotation about the longitudinal axis thereof under the action of an actuation mechanism 7 which will be described in greater detail with reference to FIG. 2.

Figure 2:
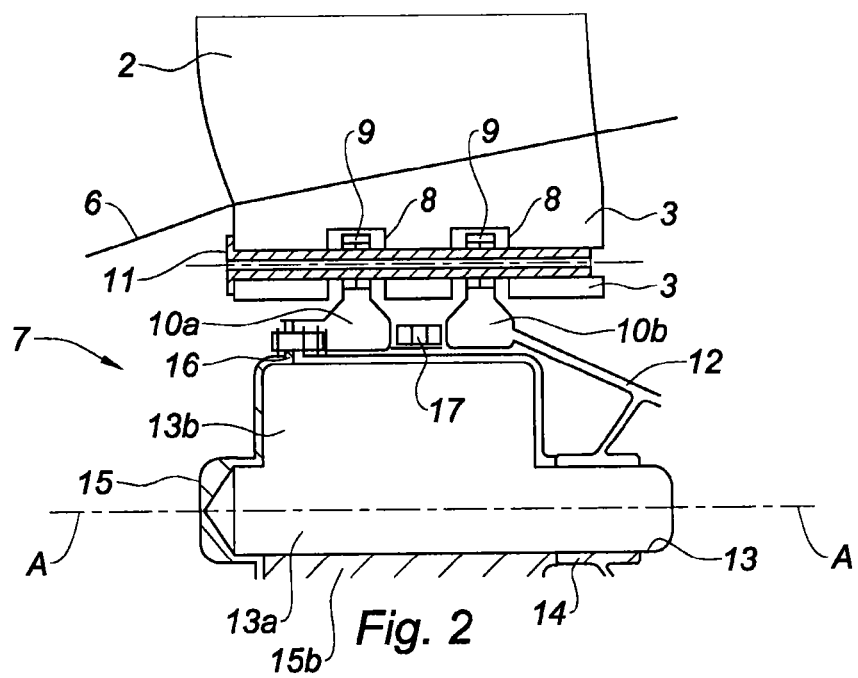
FIG. 2 is an axial cross section of the fan of FIG. 1.

FIG. 2 shows the lower portion of a vane 2 whose blade root 3 is recessed by two circumferential grooves 8, in which there are inserted the radially external ends of two fan discs 10a and 10b which are positioned side by side along the rotation axis A of the turbojet engine. Those radial ends are in the form of caps 9 into the hole of which a fixing axle 11 of the vane 2 extends. The blade root 3 consequently has a cylindrical shape which is aligned in accordance with the longitudinal axis A of the engine, and through which a hole extends at the centre thereof in order to allow said fixing axle to be received therein. The connection between the axle 11 and the cap 9 for each of the two discs is a ball-and-socket joint which thereby allows the axle 11 and, consequently, the blade root 3 to be orientated in a direction which is not strictly perpendicular to the radial direction of the discs and which is more generally offset angularly in a tangential plane relative to the direction of the rotation axis A of the engine. That freedom of movement in terms of rotation conferred on the blade roots 3 allows variation of the pitch of the vanes 2 of the fan 1, with the orientation of the fixing axle 11 being displaced.

The selection of a ball-and-socket joint between the axle 11 and the caps 9 allows, in addition to the tangential displacement of the shaft 11 in order to bring about the variation of the pitch, the axial displacement which results from the roundness of the discs and from the fact that the location of the axle 11 in the region of the cap of the movable disc is, in a projection in the radial plane which extends through the cap of the fixed disc, radially nearer the rotation axis of the engine than the location of the axle 11 in the region of the cap of the fixed disc.

In mechanical terms, there is thereby obtained a fixing device for the vanes which takes into consideration all the displacements resulting from the relative rotation of the fan discs, as a result of a simple ball-and-socket joint, without needing more complicated devices such as a flexible disc fixing means or the presence of bearings. As a result of simple movable metal components, there is obtained a great simplicity and a good level of consideration of the efforts for retaining the vanes. This device ensures, in a single connection, compliance with three functions, the function of retention of the vanes, of guiding the vanes during rotation about the longitudinal axis thereof and of controlling the change of the pitch thereof.

It should be noted that, during a change of pitch of the fan, the distance between the two ball-and-socket connection means of the cap 9 varies. Consequently, at least one of the two caps must be mounted so as to slide on the fixing axle 11 so that this distance may vary. Furthermore, the grooves 8 must be sufficiently wide for the caps 9 to be able to move as much as necessary.

If, on the other hand, it is desirable for the caps 9 to be blocked in terms of translation on the fixing axle 11, it is necessary for the connection at the ring 17 to be a sliding pivot joint so that the axial spacing between the discs 10a and 10b is variable.

The two discs 10a and 10b are carried by the fan shaft 12 of the turbojet engine as follows. Firstly, the second disc 10b, shown here as the disc which is positioned furthest downstream, without this configuration being absolutely necessary, is carried in a conventional manner directly by the fan shaft 12. It is connected thereto via a connection, for example, of the bolted type and it rotates together therewith. On the other hand and secondly, the upstream disc or first disc 10a is connected to that fan shaft by means of the actuation mechanism 7 which is in the form of a rotary actuator. Other actuation devices may be envisaged such as, for example, a ball screw or any other angular offset means for a disc in relation to another disc, given that it ensures the retention of the relative position of the two discs after they have been offset.

The rotary actuator 7 comprises a portion 13, known as the fixed portion, which rotates with the fan shaft 12, to which it is fixedly joined in terms of rotation by a drive means 14, for example, having corrugations in order to allow disassembly of the mechanism 7 at the front. That fixed portion 13 is conventionally in the form of a cylindrical axle 13a which extends axially along the rotation axis A of the turbojet engine and from which there extends radially a shoulder 13b, to which the pressure of a hydraulic fluid can be applied in order to ensure the control in terms of position of the rotary actuator. The fixed portion 13 is enclosed in a vessel, called the movable portion 15, which is also of cylindrical form and which surrounds the axle 13a and the shoulder 13b without play and which can rotate in relation to said fixed portion 13 about the axle 13a thereof. That hydraulic vessel 15 is separated into two by a radial wall 15b which extends only in accordance with a radius so as to generate at one side and the other of the shoulder 13b two chambers in which a hydraulic liquid under two different hydraulic pressures can be conveyed in order to control the rotation of the rotary actuator.

The movable vessel 15 further carries, on the outer portion thereof, a fixing flange 16 which fixedly joins it to the first fan disc 10a and which allows, with the angular position of the movable portion 15 being controlled in relation to the fixed portion 13, control of the angular displacement of that first disc 10a relative to the second disc 10b. Finally, a ring 17 for guiding the first disc 10a in terms of rotation is positioned between the two discs in order to bring about the guiding of the disc 10a in terms of rotation in relation to the disc 10b.

Figure 3:
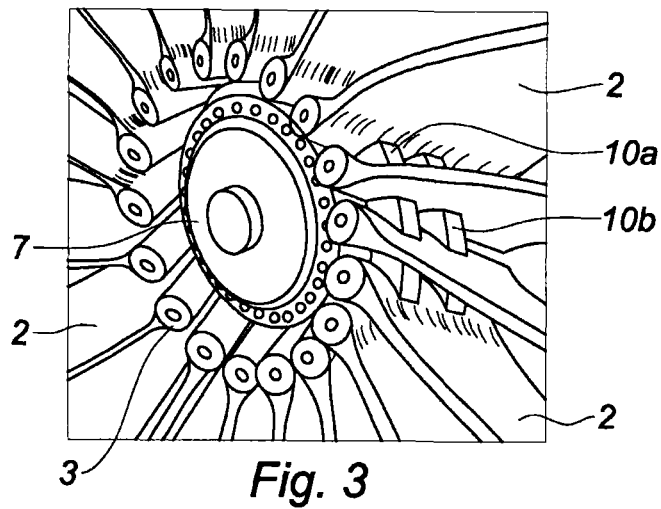
FIGS. 3, 4 and 5 are detailed views of the control device of the pitch of the vanes of the fan of FIG. 1, the vanes being in a flight configuration, in a feathered state and in reverse, respectively.

FIG. 3 shows the position of the vanes 2 in a flight configuration, that is to say, with the vanes orientated with an angle of incidence, called a positive angle, in relation to the intake direction of the air at the fan 1, the air encountering the vane at the intrados thereof. The first disc 10a is displaced in the direction of rotation of the vanes in relation to the second disc 10b, which displaces the leading edge of the vanes in the direction of rotation while the trailing edge thereof remains retained by the second disc. The angular spacing obtained thereby between the two discs by means of the actuation mechanism 7 is defined so as to confer at any time on the vanes the angle of incidence which is suitable for the correct operation of the fan in the flight configuration involved.

Figure 4:
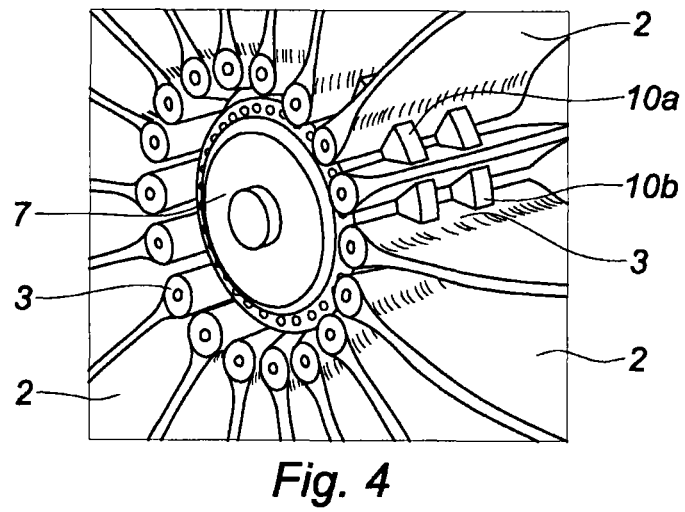

FIG. 4 shows the position of the vanes 2 in the feathered position, that is to say that the chord thereof is aligned with the direction of the air being drawn in at the fan. In relation to the position of FIG. 3, the first disc 10a has been displaced by the actuation mechanism 7 in the opposite direction to that of the rotation of the vanes, in relation to the second disc 10b.

Figure 5:
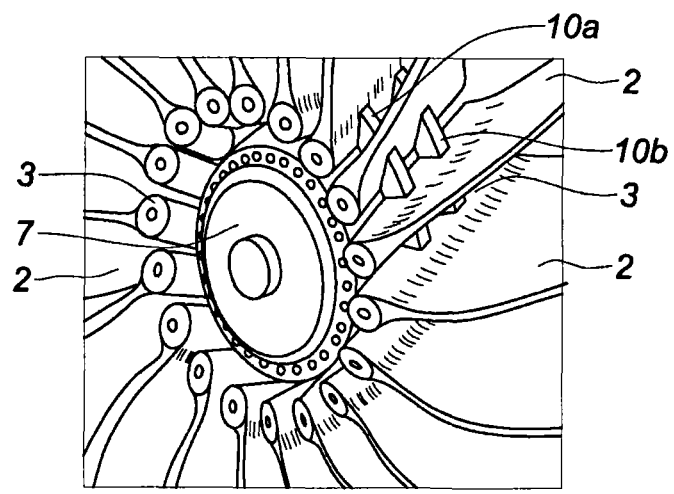

Finally, FIG. 5 shows the position of the vanes in a reverse position, that is to say, in a position in which they direct the flow of air which passes through them in an upstream direction in respect of the engine. They then have a negative angle of incidence relative to the air flow, which results from the displacement of the first disc 10a in an opposite direction to that of the rotation of the vanes, with an extent which brings it beyond the position corresponding to the feathered position.

The operation of the mechanism for changing the pitch of the vanes 2 according to the invention will now be described.

During operation, the fan 1 of the turbojet engine rotates about the axis A thereof, the pitch of the vanes being in a given position which a priori corresponds to the position which is best adapted to the case of flight operation being considered. The low-pressure rotor of the turbojet engine drives in rotation the fan shaft 12, to which there are rigidly secured, on the one hand, the second disc 10b and, on the other hand, the axle 13a of the fixed portion 13 of the actuation mechanism 7 by means of the drive means 14.

During permanent operation, the pressures in the two chambers of the movable portion 15 are equal and the shoulder 13b is in a fixed position in relation to that movable portion. The vessel 15 of the movable portion thus has the same rotational speed as the fixed portion 13. As a result of the rigid connection brought about by the flange 16 between the vessel 15 and the first disc 10a, that first disc rotates at the same speed as that fixed portion and, consequently, as the fan shaft 12 and the second disc 10b. Consequently, all the movable components rotate at the same speed and the pitch of the vanes 2 remains constant during the operation of the engine during flight, in the absence of any action by the actuation mechanism 7.

When it is desirable to modify the pitch of the vanes, whether this be by a deliberate action of the pilot in order to switch the engine into feathered mode, or into reverse mode, or whether this be as a result of the control of the engine which seeks to adapt the pitch of the vanes to the present operation of the engine, an excessive hydraulic pressure is transmitted to one of the two chambers of the vessel 15, the chamber involved being the one which corresponds to an actuation of the shoulder 13b in the direction in which it is desirable to modify the pitch. The transmission of this excess pressure modifies the equilibrium of the pressures between the two chambers and rotates the movable portion 15 about the main axis A in reaction to the shoulder 13b of the fixed portion 13. In so doing, the movable portion 15 carries, by means of the flange 16, the first disc 10a, in relative rotation in relation to the second disc 10b.

The displacement in relative rotation of the two discs brings about the rotation of the fixing axle 11 of the vanes 2 and the movement, in one direction, of the leading edge thereof in relation to the trailing edge thereof, which produces the change in pitch desired. The assembly of the fixing axle 11 on the ball-and-socket joint in the caps 9 of the two discs allows the rotation thereof and therefore the rotation of the vane about the longitudinal axis thereof in order to generate the modification of pitch desired.

In relation to the conventional pivot-type systems, the advantages of the device described are as follows:
  the compactness of that system allows fans to be configured with hub ratios which are identical to those of current turbofans; there is no increase in the spatial requirement of the engine and therefore no disadvantage in terms of drag and mass;
  it is possible to have the same number of blades as in a conventional turbofan and therefore the same output as current fans;
  the internal stream may be produced in a conical manner so that the aerodynamics of the blade root benefit from a centrifuging effect;
  the centripetal retention of the vanes is brought about by a naturally dual structure, with two caps and two fan discs;
  finally, the centrifugal efforts have a tendency to naturally bring the vanes into the feathered position in the event of a loss of pressure in the control system for the pitch thereof.

Furthermore, the maintenance of the fan remains simple because the various elements thereof are easy to disassemble. It is simply necessary, on the one hand, to remove the axles which connect them to the fan discs in order to disassemble the vanes 2 and, on the other hand, to disassemble the cone 6 in order to have access to the actuation mechanism 7, which is withdrawn at the front, following simple disassembly of the flange 16.

However, the device described requires platforms between the vanes which can be adapted to the play which exists and which is variable owing to the developing pitch of the vanes. To that end, various solutions may be envisaged, such as deformable platforms of elastomer material, articulated platforms or overlapping platforms.

The invention claimed is:
1. A compressor rotor for a turbine engine comprising:
  a shaft and at least two discs which are mounted on the shaft to ensure retention of a same set of movable vanes during rotation about a rotation axis of the shaft;
  at least a first disc being mounted in a movable manner on the shaft to be able to generate angular spacing with respect to a second disc;
  at least one of the two discs being formed to receive at least one fixing means for each vane;
  a connection between at least one of the two discs and the fixing means allowing rotation of the fixing means about an axis;
  wherein the connection is a ball-and-socket joint which is tangentially and axially movable.
2. The compressor rotor according to claim 1, wherein the two discs are formed to receive the fixing means in a form of a ball-and-socket joint which is tangentially and axially movable.

3. The compressor rotor according to claim 1, wherein at least one of the two discs comprises a cap, through which a hole provided with the ball-and-socket joint extends, the fixing means for the vanes being an axle which extends through the hole.

4. The compressor rotor according to claim 1, wherein the second disc is fixed in terms of rotation in relation to the shaft, the first disc being fixed to an actuation means which comprises a fixed portion which is connected to the shaft and a movable portion, the movable portion being movable in terms of rotation about the rotation axis of the shaft.

5. The compressor rotor according to claim 4, wherein the actuation means is a rotary actuator.

6. The compressor rotor according to claim 5, wherein the rotary actuator comprises an axle which extends in accordance with the rotation axis of the shaft, to which it is rigidly fixed, and a vessel which is movable in terms of rotation about the axle, the first disc being mounted on the vessel.

7. The compressor rotor according to claim 6, wherein the vessel of the rotary actuator comprises two chambers configured to receive a hydraulic liquid for rotation of the first disc relative to the second disc.

8. The compressor rotor according to claim 1, further comprising a rotation guiding ring which is positioned between the two discs to ensure that the respective axial pitches thereof are in a permanent state.

9. The compressor rotor according to claim 1, wherein the connection between at least one of the two discs and the fixing means allows rotation of the fixing means about a radial axis or a longitudinal axis of the vane.

10. A fan module of a bypass turbojet engine having a high dilution rate, comprising a fan rotor according to claim 1.

11. A bypass turbojet engine comprising a fan module according to claim 10.

* * * * *